United States Patent [19]
Kofink

[11] Patent Number: 5,925,941
[45] Date of Patent: Jul. 20, 1999

[54] SWITCHING CIRCUIT FOR MOTOR VEHICLE FOG LIGHTS AND HEADLIGHTS

[75] Inventor: Peter Kofink, Ingersheim, Germany

[73] Assignee: ITT Manufacturing Enterprises Inc., Wilmington, Del.

[21] Appl. No.: 08/943,647

[22] Filed: Oct. 3, 1997

[30] Foreign Application Priority Data

Oct. 4, 1996 [DE] Germany .............. 196 40 941

[51] Int. Cl.⁶ .............................................. B60L 1/14
[52] U.S. Cl. ................................... 307/10.8; 315/77
[58] Field of Search .................. 307/9.1, 10.1, 307/10.8; 315/76, 77, 82, 83; 340/458, 468, 469; 361/191; 701/1, 36, 49

[56] References Cited

U.S. PATENT DOCUMENTS

| | | | |
|---|---|---|---|
| 3,723,721 | 3/1973 | Weber | 315/82 |
| 3,898,513 | 8/1975 | Kopernik et al. | 315/129 |
| 4,097,839 | 6/1978 | Lesiak | 315/82 |
| 4,301,390 | 11/1981 | Earle | 315/82 |
| 4,497,988 | 2/1985 | Brown | 200/61.85 |
| 4,870,296 | 9/1989 | Nordeborn et al. | 307/10.8 |
| 4,896,075 | 1/1990 | Earle | 315/82 |
| 5,120,981 | 6/1992 | Cope | 307/10.8 |
| 5,182,494 | 1/1993 | Segaud | 315/80 |
| 5,773,935 | 6/1998 | Wagner et al. | 315/77 |
| 5,798,687 | 8/1998 | Littlejohn et al. | 340/426 |

OTHER PUBLICATIONS

Search Report of the German Patent Office for Application 19640941.1 filed Oct. 4, 1996.

*Primary Examiner*—Richard T. Elms
*Attorney, Agent, or Firm*—J. Gordon Lewis

[57] ABSTRACT

An automatic fog light cutoff, controlled by the headlights, is described for motor vehicles. The switching circuit for the automatic fog light cutoff is comprised of two current leads connected to each other through a normally-open relay. When the fog lights are switched on, the relay that is connected to the ground of the headlight current lead closes the fog light current lead and thus activates the fog lights. If the headlights are switched on, the current flow in the relay between the fog light current lead and the headlight current lead is interrupted, such that the currentless normally-open relay opens the fog light current lead and shuts off the fog lights.

2 Claims, 1 Drawing Sheet

SWITCHING CIRCUIT FOR MOTOR VEHICLE FOG LIGHTS AND HEADLIGHTS

TECHNICAL FIELD

The invention relates to a switching circuit for motor vehicle fog lights and headlights that assures that the fog lights are automatically switched off when the headlights are turned on.

BACKGROUND

Switching circuits have been proposed in which the fog lights are switched off when the headlights are switched on by means of relays or through a combination of relays with an additional electronic connection.

In the case of the simple relay circuit proposed, the relay is connected as a normally-closed relay, so that the coil of the relay is connected in parallel with the headlights to a headlight lead and so that the contact of the relay is in series with the fog lights to a fog light lead. As soon as the headlights are switched on, the battery voltage is applied to the relay coil and the break contact is actuated. The current supplied to the fog lights is thus interrupted and the fog lights are thus switched off. This connection has the shortcoming that an expensive special relay must be inserted because there is no standardized vehicle relay that can switch the corresponding lamp load with the break contact.

With an additional electronic circuit the relay can be used as a normally-open relay. The electronics are constructed so that the make contact of the relay is closed with the fog lights switched on and thus the fog lights are switched on.

As soon as the headlights are activated, the electronics open the current circuit to the relay coil so that the make contact is opened and the fog lights are switched off. The disadvantage of both switching circuits lies in the need to use special structural components or additional electronics that make the switching complicated and more expensive.

The invention proposes the construction of a switching circuit of the above-mentioned type in a cost-favorable and simple manner.

SUMMARY OF THE INVENTION

The principle of the present invention consists in interrupting the current supply to the fog lights and thus switching them off with the aid of a relay controlled by the switching on of the headlights.

The advantage of the invention consists in the fact that the solution to the problem can be constructed with a single standardized vehicle relay.

DETAILED DESCRIPTION OF THE PREFERRED EMBODIMENTS

Figure 1:
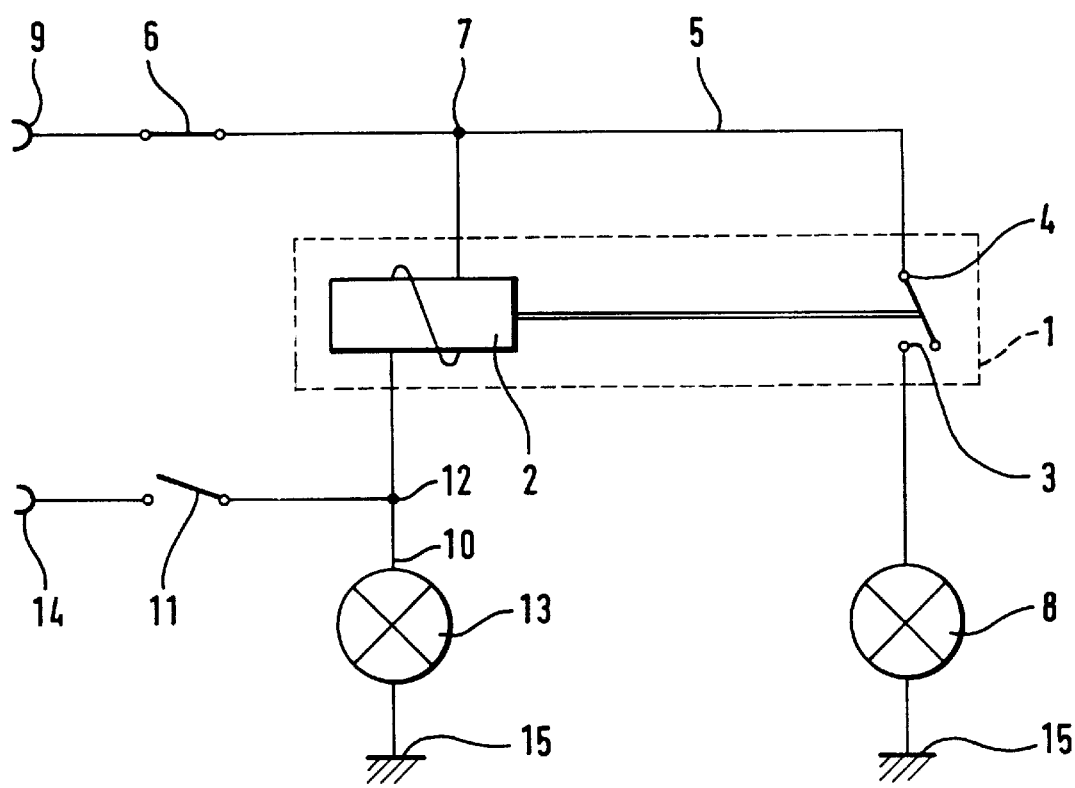
FIG. 1 shows a schematic diagram of the switching circuit for an automatic fog light cutoff.

The switching circuit according to FIG. 1 shows a fog light current lead 5, connected to the connection terminal 9 to which a battery voltage is applied. The current lead 5 is connected through a fog light switch 6, a contact point 7, the make contact 3 of a relay 1 and a fog light 8 to ground 15. A headlight current lead 10 begins with a second connection terminal 14, which also carries the battery voltage, and continues through a headlight switch 11, a contact point 12 and a headlight 13 to ground 15. Both current leads 5 and 10 are connected through a relay coil between the contact points 7 and 12 in parallel with each other.

The make contact 3 of a relay 1 is connected in series to the fog light 8 and to the fog light current lead 5 with the relay 1 normally open. If the fog light switch, to which the battery voltage is also connected through a connection with the terminal 9, is turned on, this voltage is applied to the relay coil 2. Its ground is connected through the ground of the headlights 15 with the vehicle ground and current flows through the relay coil 2, such that the make contact 3 of the relay 1 connects the fog light current lead 5. The fog lights illuminates.

If the headlights 10 are switched on, the battery voltage is also connected to the ground connection of the relay coil 2 and to the headlight lamps 13. Due to the heating of the spiral filament in the headlight lamp that thus results, the resistance of the conducting element between the contact points 12 and 15 increases so that the same voltage lies at the contact point 12 as at the point 7, whereby no coil current flows any longer, which is necessary for holding the make contact 3. Due to the currentless relay coil, the make contact is opened and thus interrupts the fog light current and switches off the fog lights.

The special feature of the invention is that a simple and cost-favorable switching circuit can be realized for automatically switching off the fog lights when the headlights are turned on, by means of a standard vehicle relay.

I claim:

1. A switching circuit for motor vehicle fog lights and headlights, comprising:

a headlight connected to a headlight switch by a first conductor;

a fog light connected to a fog light switch by a second conductor;

a relay comprising a coil and a make contact;

said coil being energized upon turning said fog light switch on to thereby close said make contact and turn said fog light on, and said coil being deenergized upon further turning said headlight switch on to thereby open said make contact and turn said fog light off.

2. The switching circuit as claimed in claim 1, wherein:

said headlight is connected to said headlight switch by said first conductor through a first contact point;

said fog light is connected to said fog light switch by said second conductor through a second contact point;

terminals of said first and said second conductors are connected to a vehicle battery;

said make contact being connected in series with said fog light; and said coil being connected between said first and said second contact points, whereby after said coil is energized upon said turning said fog light switch on, it is deenergized by being short circuited upon said further turning said headlight switch on.

* * * * *